US012667856B2

(12) United States Patent
Merritt et al.

(10) Patent No.: US 12,667,856 B2
(45) Date of Patent: Jun. 30, 2026

(54) CONTROL SYSTEM FOR A LIQUID PUMP SPRAYER

(71) Applicant: THE FOUNTAINHEAD GROUP, INC., New York Mills, NY (US)

(72) Inventors: Matthew Merritt, Oneida, NY (US); Ronald Fusco, Poland, NY (US); Martin Comstock, Herkimer, NY (US)

(73) Assignee: THE FOUNTAINHEAD GROUP, INC., New York Mills, NY (US)

( * ) Notice: Subject to any disclaimer, the term of this patent is extended or adjusted under 35 U.S.C. 154(b) by 45 days.

(21) Appl. No.: 18/024,596

(22) PCT Filed: Jun. 21, 2022

(86) PCT No.: PCT/US2022/034329
§ 371 (c)(1),
(2) Date: Mar. 3, 2023

(87) PCT Pub. No.: WO2022/271688
PCT Pub. Date: Dec. 29, 2022

(65) Prior Publication Data

US 2024/0109085 A1 Apr. 4, 2024

Related U.S. Application Data

(60) Provisional application No. 63/212,796, filed on Jun. 21, 2021.

(51) Int. Cl.
*B05B 5/10* (2006.01)
*B05B 9/08* (2006.01)
(Continued)

(52) U.S. Cl.
CPC .............. *B05B 5/10* (2013.01); *B05B 9/0861* (2013.01); *B05B 12/085* (2013.01); *B05B 12/008* (2013.01)

(58) Field of Classification Search
CPC ....... B05B 5/10; B05B 9/0861; B05B 12/085; B05B 12/008
See application file for complete search history.

(56) References Cited

U.S. PATENT DOCUMENTS 4,988,015 A * 1/1991 Price .................. B05B 13/0431 222/1
5,054,650 A * 10/1991 Price .................... B05B 12/085 222/1
(Continued)

OTHER PUBLICATIONS

International Search Report and Written Opinion of PCT/US22/34329, filed Jun. 21, 2022. pp. 1-7. Mailing date of Search Report, Oct. 6, 2022.

*Primary Examiner* — Joseph A Greenlund
(74) *Attorney, Agent, or Firm* — BOND, SCHOENECK & KING, PLLC; George R. McGuire

(57) ABSTRACT

A battery-powered liquid pump sprayer having a control system capable of providing the user with a selectable series of defined spray application pressures, flow rates, and patterns that are accurately sustained over the duration of a spray application session. The pump sprayer has a control system for use with a battery having a voltage supply amount and a motor having a voltage demand amount that is less than the voltage supply amount. A microcontroller of the control system is coupled to the battery and the motor, and is programmed to provide a supply voltage from the battery to the motor and to ensure that the supply voltage is at least as much as the voltage demand amount.

4 Claims, 9 Drawing Sheets

(51) Int. Cl.
*B05B 12/00* (2018.01)
*B05B 12/08* (2006.01)

(56) References Cited

U.S. PATENT DOCUMENTS

| | | | | |
|---|---|---|---|---|
| D1,078,930 | S * | 6/2025 | Wenzel | D23/225 |
| 2001/0020653 | A1* | 9/2001 | Wilson | B05B 5/1691<br>239/708 |
| 2005/0231146 | A1* | 10/2005 | De Frutos | H02P 7/06<br>318/400.23 |
| 2009/0116986 | A1* | 5/2009 | Lishanski | F04B 7/04<br>417/491 |
| 2017/0122304 | A1* | 5/2017 | Funabashi | F04B 49/08 |
| 2019/0388918 | A1* | 12/2019 | Gustafson | B05B 9/0861 |
| 2020/0246764 | A1* | 8/2020 | Putrello | B05B 7/2464 |
| 2020/0391236 | A1* | 12/2020 | Recker | B05B 7/2464 |
| 2021/0046494 | A1* | 2/2021 | Lam | B05B 9/0888 |
| 2021/0291209 | A1* | 9/2021 | Audette | B05B 9/0861 |
| 2021/0362172 | A1* | 11/2021 | Putrello | A01M 7/0071 |
| 2022/0339647 | A1* | 10/2022 | Deschamps | B05B 7/0807 |
| 2023/0158524 | A1* | 5/2023 | Mitchell | B05B 9/0838<br>239/398 |
| 2023/0191433 | A1* | 6/2023 | Putrello | B05B 9/01<br>222/383.1 |
| 2024/0109085 | A1* | 4/2024 | Merritt | B05B 12/085 |

* cited by examiner

Manual Liquid Pump Backpack Sprayer

Manual Liquid Pump Backpack Sprayer

Manual Liquid Pump Backpack Sprayer

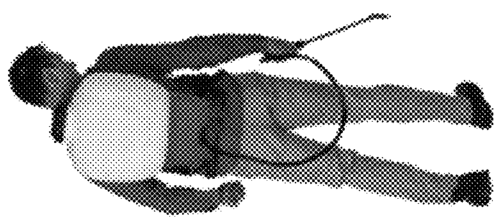
Figure 4. Prior Art
Conventional
Battery-Powered
Liquid Pump Sprayer
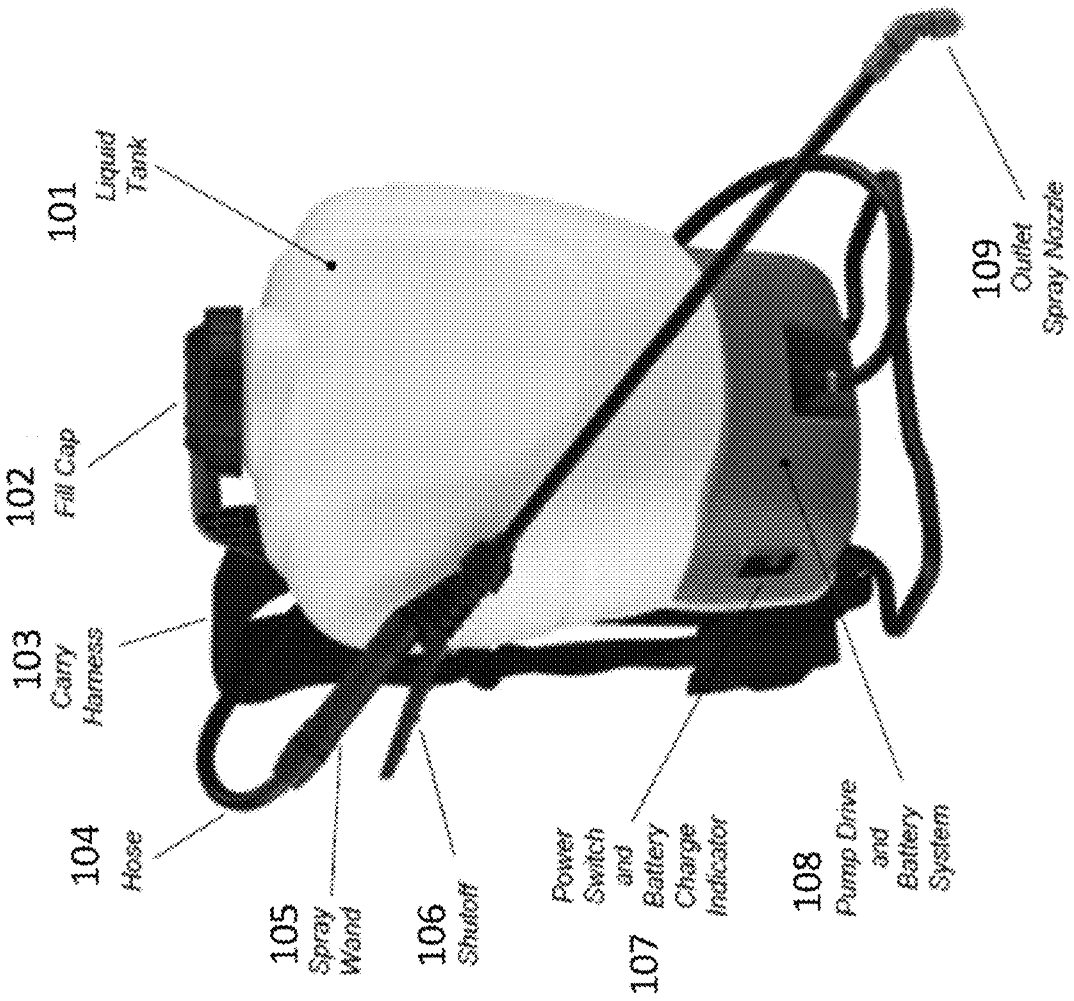
Figure 5. Prior Art
Conventional
Battery-Powered
Liquid Pump Sprayer Lithium-Ion Battery
for
Conventional
Battery-Powered
Liquid Pump Sprayer Charging Equipment
for
Conventional
Battery-Powered
Liquid Pump Sprayer Conventional Battery-Powered Liquid Pump Sprayer A — Battery Supply Voltage and Motor Demand Voltage are both Nominal 18.0 volt

| | A | B | C | D | E | F | G | H | I | J | K |
|---|---|---|---|---|---|---|---|---|---|---|---|
| 2 | Conventional Sprayer | B — Exemplar Sprayer Set to Highest Performance Setting: Straight-Stream Nozzle for Nominal 0.5 gpm at 40 psi | Input | Battery | Operational Range of Supply Voltage from 18 V Battery, volts | 21.0 Upper Supply (Charge) Limit | 20.0 | 19.0 | 18.0 | 17.0 | 16.5 Lower Supply (Discharge) Limit |
| 3 | | | | Motor | Demand Voltage of Nominal 18V Motor, volts | | | | 18.0 | | |
| 4 | | | | | Motor-to-Pump Drive Speed, rev/min | 4,400 | 4,300 | 4,200 | 4,100 | 4,000 | 3,800 |
| 5 | | | Output | Pump | Sprayer Pump Pressure, psi | 48.5 | 47.0 | 45.0 | 43.0 | 41.0 | 40.0 |
| 6 | | | | | Sprayer Pump Flow, gpm | 0.56 | 0.55 | 0.54 | 0.53 | 0.51 | 0.50 |

Sprayer output at full-charge D

Specified sprayer output C

FIG. 8A

Conventional Battery-Powered Liquid Pump Sprayer

Disclosed Battery-Powered Liquid Pump Sprayer

Disclosed Battery-Powered Liquid Pump Sprayer

| | L | M | N | O | P | Q | R | S | T | U | V |
|---|---|---|---|---|---|---|---|---|---|---|---|
| 7 | | | | | | E Nominal Battery Supply Voltage is 18.0 volt<br>Nominal Motor Demand Voltage is 16.5 volt | | | | | |
| 8 | Disclosed Sprayer | F Disclosed Sprayer Set to Highest Performance Setting: Straight -Stream Nozzle for Nominal 0.5 gpm at 40 psi | Input | Battery | Operational Range of Supply Voltage from 18 V Battery, volts | 21.0<br>Upper Supply (Charge) Limit | 20.0 | 19.0 | **18.0** | 17.0 | 16.5<br>Lower Supply (Discharge) Limit |
| 9 | | | | Motor | Demand Voltage of Nominal 16.5V Motor, volts | **16.5** | | | | | |
| 10 | | | | | Pulse Width Modulator (PWM) Duty Cycle, percent | 75% | 80% | 85% | 90% | 95% | 100% |
| 11 | | | | | Motor-to-Pump Drive Speed, rev/min | 3,800 | 3,800 | 3,800 | 3,800 | 3,800 | 3,800 |
| 12 | | | Output | Pump | Sprayer Pump Pressure, psi | 40.0 | 40.0 | 40.0 | 40.0 | 40.0 | 40.0 |
| 13 | | | | | Sprayer Pump Flow, gpm | 0.50 | 0.50 | 0.50 | 0.50 | 0.50 | 0.50 |

G

FIG. 10A

Disclosed Battery-Powered Liquid Pump Sprayer

CONTROL SYSTEM FOR A LIQUID PUMP SPRAYER

CROSS-REFERENCE TO RELATED APPLICATION

This application is the United States National Phase application filed under 35 U.S.C. 371 of International Application No. PCT/US22/34329, filed Jun. 21, 2022, which relates and claims priority to Applicant's U.S. Provisional Patent Application No. 63/212,796, filed Jun. 21, 2021, the entirety of each of which is hereby incorporated by reference.

FIELD OF THE INVENTION

The present disclosure is directed generally to a control system for a liquid pump sprayer. The control system improves upon such conventional sprayers by providing a user-selectable series of defined spray application pressures, flow rates, and patterns that are that are accurately sustained over the duration of a spray application session.

BACKGROUND

Portable liquid-pump sprayers are widely employed both professionally and around the home to apply such chemicals as herbicides, insecticides, fertilizers, detergents, disinfectants, and water. These sprayers may be hand-carried, worn as a backpack, or wheeled on a cart for transport to the application site.

The earliest and most traditional liquid-pump sprayers are manually pumped so to produce the pressure necessary to spray; more recent sprayers employ battery-powered electric motor technology to drive the pump. As will be shown, both types of sprayers lack the control to accurately establish and sustain a specified pump outlet pressure for the duration of a spraying session.

Especially for professionals, the control of a specified pump outlet pressure, with the resulting flow rate and spray pattern for a given spray outlet nozzle, is important. This control of outlet pump pressure is needed for efficient, accurate, and economical application of the sprayed liquid product.

The operational effectiveness of pressure control for both types of conventional sprayers are discussed herein as relevant background to the disclosed control system.

Shown as a backpack sprayer in FIG. 1, the earliest and most traditional liquid-pump sprayer requires manual input by the user to operate the pump in order to pressurize the liquid for spraying.

FIG. 2 provides a first overview of such a manual-pump backpack sprayer, where the liquid is filled, via cap 2, into tank 3 and is then pressurized by liquid pump system 8 as the user reciprocates pump handle 1. Once the user has pumped enough to pressurize the liquid sufficiently, and with hand-held spray wand 5 aimed appropriately, shutoff 6 is opened, which permits the liquid to flow from the tank, through the pump system, and along through hose 4 to spray nozzle 9, where the liquid exits as a spray pattern. The sprayer is conveniently carried on the user's back with straps provided by harness 7.

Note here that spray nozzle 9 may be of adjustable form, or may be changed out via a selection of various nozzle formats, in order to produce the pattern necessary for the intended spray application.

A well-understood disadvantage of a traditional manual pump system is that in order to sustain the pressure needed to produce the desired outlet flow and spray pattern, the user must pump repeatedly and regularly over the course of the spray session. As an attempt to improve the control of pump outlet pressure for pumping efficiency and spraying effectiveness, a pressure accumulator is widely employed.

The schematic of FIG. 3 represents a more detailed view of the aforementioned manual liquid pump system, showing the implementation of such a pressure accumulator. The liquid mixture to be sprayed is filled, via cap 2, into tank 3 and then enters liquid pump system 5 via inlet filter 6. As shown, this liquid pump system 5 comprises liquid pump 7 and pressure accumulator 8, along with requisite fluid paths and check valves.

In preparation for spraying, shutoff valve 11 is closed and pump handle 1 is manually reciprocated so as to prime the pump and pressurize the liquid to be sprayed. The pressure accumulator is designed to contain a prescribed volume of air and liquid such that, as the pressurized liquid from the pump now flows into the accumulator, the contained air becomes increasingly compressed. Once sufficiently compressed, this air pressure acts beneficially against the liquid also contained within the accumulator.

This preparation completed, and hand-held spray wand 10 aimed appropriately, shutoff 11 is now opened, which permits the pressurized air acting on the liquid within the accumulator to cause the similarly pressurized liquid to flow out from pressure accumulator 8 and along through hose 9 and wand 10, to spray nozzle 12, where the liquid exits as a spray pattern.

Without such a pressure accumulator, the liquid flowing from the reciprocating action of the manual pump would contain a high pressure pulse on the pressure stroke, followed by zero pressure pulse on the return stroke. Even with a system of check valves, the resulting alternating pressure spikes would make it difficult to establish and sustain the desired flow rate and spray pattern for an application.

With the employment of such a pressure accumulator, the spring-like force provided by the compressed air acts on the liquid co-contained within the accumulator to even-out the incoming alternating pulsations of liquid flow produced by the manual pump. In this manner, liquid pump system 5 can provide a relatively stable average outlet liquid pressure; however, to control this desired liquid pressure at the outlet nozzle, the user must regularly and continuously operate the pump by manually reciprocating handle 1 in order to maintain the needed air pressure within the accumulator. Even with such regular pumping, the air pressure can vary between pump strokes such that the control of outlet liquid pressure and resulting application flow rate are resultantly varying and, therefore, inefficient.

As an improvement to manual pump sprayers, more recently introduced are now-conventional portable liquid-pump sprayers that employ battery-powered electric motor technology to drive the pump. Shown as a backpack sprayer in FIG. 4, a conventional battery-powered liquid-pump sprayer does not require manual pumping in order to control the liquid pressure needed for effective spraying.

Also not required, as needed for the manual liquid pump sprayer, is a pressure accumulator to control the pump outlet pulse variation. The pressure pulses from a battery-powered liquid-pump sprayer pump are of such small magnitude and high speed that the outlet pressure pulse variation is negligible. As will be shown, however, the overall pump outlet pressure can vary unacceptably, depending on the in-use state of charge of the battery.

FIG. 5 provides an initial overview of such a conventional battery-powered liquid-pump backpack sprayer, where the liquid is filled via cap 102, into tank 101. Harness 103 permits the sprayer to be carried on the user's back. The liquid is pressurized by the battery-powered pump drive system 108, as power switch 107 is engaged. An optional flow control adjustment is not shown.

With power on and the liquid sufficiently pressurized, and with hand-held spray wand 105 aimed appropriately, shutoff 106 is opened, which permits the liquid to flow from the tank and along through hose 104 to outlet spray nozzle 109, where the liquid exits as a pattern.

A battery charge indicator is conveniently provided adjacent to the power switch, so that the user can monitor the in-use state of charge of the rechargeable battery.

FIG. 6 demonstrates how battery 112 may be inserted for operation and removed for charging, as shown here in a housing on the backside of sprayer 100.

For both this exemplar conventional sprayer and the disclosed sprayer to follow, and as a reference for the purpose of this disclosure, a modern nominal 18 V lithium-ion (Li-ion) battery is employed; this battery specifies a safe full-charge state at 21.0 V and a safe depleted state at 16.5 V. Other nominal battery voltage configurations, such as 12, 20, and 40 volts, would be equally applicable for the compared conventional and disclosed sprayers of this disclosure.

FIG. 7 illustrates the equipment that provides for convenient battery charging, with battery 115 removed from sprayer and inserted into charging unit 114 that is powered by wall outlet plug connector 113.

The schematic of FIG. 8 represents a more detailed view of pump drive and battery systems for a conventional battery-powered liquid-pump backpack sprayer, in order to illustrate the means by which the liquid outlet pressure, and resulting flow rate and nozzle outlet spray pattern, is controlled.

Referring to FIG. 8, the liquid mixture 203 to be sprayed is filled, via cap 202, into tank 201 and then enters pump drive and battery systems 205 via inlet filter 204. As shown, this system 205 includes battery 211, controller 209, electric motor 210, and liquid pump 212. Controller 209 is a microcomputer that is programmed to receive inputs from the battery, pressure sensor 213, an optional flow control 208, and power switch 206. The controller directs output voltage to the electric motor, and output information to the battery charge indicator 207.

The battery powers the electric motor, which drives the pump by mechanical means. For this exemplar sprayer, and by convention, the nominal operating demand voltage of the electric motor is 18-volt, to match the nominal 18-volt battery supply voltage.

Note here that the in-use state of charge for a modern Li-ion battery requires proper management by controller 209 in order to provide user safety and to protect the functional integrity of the battery. Accordingly, and as is typical, controller 209 monitors the supply voltage from installed battery 211 so as to limit the upper (full-charge) supply condition at 21.0 V, and terminate the battery supply when the voltage becomes depleted to a low charge limit at 16.5 V. Additionally, the controller terminates the battery supply to the motor if pressure sensor 213 detects a high pressure limit has been reached.

Note also that this battery voltage supplied to the motor directly controls the speed (revolutions/minute) of the motor which, in similarly direct fashion, controls the pump speed and the resulting pump outlet pressure, flow rate, and the ultimate spray pattern for a given nozzle.

As will be shown, a weakness in this voltage control aspect of the conventional battery-powered liquid pump sprayer becomes apparent as the battery voltage supply state depletes during the course of a spray application session. As mentioned earlier, the nominal 18 V motor that is paired with the nominal 18 V battery is specified to provide a determined nominal pump pressure and resulting liquid flow and spray pattern.

However, because the 18 V motor speed is directly related to the battery supply voltage as provided by the controller, a freshly-charged battery at 21.0 V can result in a high application spray pressure and, in corresponding fashion, a depleted-charge battery at 16.5 V can result in a low application spray pressure. For a given nozzle, the resulting variation of pump outlet pressures, caused by this drop in supply voltage to the motor, results in application flow rates and spray patterns that vary from the desired specification.

With continued reference to FIG. 8, an optional flow control 208 may be provided on a such a conventional sprayer as a means for the user to attempt to correct for an inefficient spray pattern caused by this drop in battery supply voltage during a spray session. Although referred to as a flow control, this adjuster actually provides a pump pressure adjustment by varying supply voltage to the electric motor 210 via controller 209.

A weakness of this means of adjusting pump pressure to correct the loss of spray pattern as the battery voltage charge becomes depleted during the course of a spray application session is that it requires operator judgement and constant attention to the changing spray pattern during the spray application session.

This same weakness holds for those conventional sprayers that provide for nozzle 217 to be adjustable or changed-out to configure for various application spray patterns. As the nozzle is adjusted or changed out, optional flow control 208 may be used to subsequently adjust the pump speed to effect a liquid pressure needed to produce the desired spray pattern from the nozzle outlet. As before, this flow control adjustment requires operator judgement to establish the correct initial pattern, and constant attention to the changing spray pattern during the spray application session.

FIG. 8A summarizes the demonstrable variation in sprayer performance as the battery supply voltage becomes depleted over the duration of a spray session. As is conventional, both the battery supply voltage and motor demand voltage are a nominal 18 volts (note A). Here, the exemplar sprayer is configured for its highest specified performance setting: a straight-stream spray nozzle for a nominal 0.5 gpm flow rate at a pressure of 40 psi (note B). This sprayer was found to have been designed such that this specified nominal output performance (note C) is produced when the battery is at its fully discharged state of 16.5 volts, with motor speed at 3800 rpm.

The battery and motor inputs to the pump are charted over the duration of a spray application session, with the battery supply voltage, as expected, dropping over time from its full-charge state of 21 volts to its full discharge state of 16.5 volts (row 2, columns F-K). The corresponding motor drive speed is seen to drop from 4400 rpm to 3800 rpm (row 4, columns F-K).

Below these charted inputs, the outputs of pump pressure and flow are now considered, with the requisite variation in performance clearly presented.

The 16.5 V low limit of battery supply voltage produces a motor speed of 3800 rpm, with which the pump met the specified performance output of 0.50 gpm at 40 psi (column K, and note C).

Alternatively, the full-charge 21.0 V limit of battery supply voltage produces an increased motor speed of 4400 rpm, with which the pump produced 0.56 gpm at 48.8 psi (column F, and note D).

Thus, it can be appreciated that during a spray session the sprayer performance will vary from the specified value as the battery supply voltage drops. In this selected exemplar session, the pump liquid outlet pressure varied from the specified value by as much as 21%, and the liquid outlet flow varied by as much as 12%.

Beyond this one example, this variation of performance due to a drop in battery performance would occur for any nominal battery output specification for a conventional sprayer and nozzle configuration.

The variation in sprayer performance that results from the drop in battery voltage during a spray session is a weakness found in conventional portable battery-powered liquid pump sprayers. Such sprayers are not capable of sustaining a specified outlet pressure, flow rate, and the resulting desired spray pattern for a given nozzle. Even with an optional flow control, sustaining a desired pressure and flow is a crude and inaccurate process, requiring user judgement and continuous attention to the spray pattern.

Accordingly, there is a need in the art for a battery-powered liquid pump sprayer with a control system that provides the user with a selectable series of defined spray application pressures, flow rates, and patterns that are accurately sustained over the duration of a spray application session.

SUMMARY

The present disclosure is directed to a control system for a liquid pump sprayer.

According to an aspect is a battery powered liquid pump sprayer, comprising a liquid tank; a liquid pump having an inlet and an outlet; a conduit fluidly connecting the liquid tank to the inlet of the liquid pump, whereby liquid contained within the liquid tank can flow to the liquid pump; a hose fluidly connected to the outlet of the liquid pump and having a spray nozzle through which pressurized liquid can be discharged; a battery having a nominal low limit of safe battery supply voltage; a motor having a nominal demand voltage that is equivalent to the nominal low limit of safe battery supply voltage; at least one pressure sensor positioned within the hose adjacent the outlet of the liquid pump; a power switch to actuate the battery between on and off positions; a control system electrically coupled between the power switch and the battery and electrically coupled to the at least one pressure sensor; a spray flow control mechanism having a plurality of user selectable flow-control settings and electrically connected to the control system, wherein each flow-control setting has a particular motor demand voltage; wherein the control system comprises a microcomputer controller with pulse width modulation and comparator functions, and the pulse width modulation function continuously attenuates the varying battery supply voltage to the motor so that, for a given flow-control setting, the supply voltage to the motor is maintained at the motor demand voltage needed for that application setting.

Another aspect is a control system for a battery powered liquid pump sprayer. The control system includes a battery having a voltage supply amount, a motor having a voltage demand amount that is less than the voltage supply amount, and a microcontroller coupled to the battery and the motor, wherein the microcontroller is programmed to provide a supply voltage from the battery to the motor and to ensure that the supply voltage is at least as much as the voltage demand amount. The microcontroller may be programmed to attenuate the supply voltage to match the voltage demand amount if the supply voltage is greater than the voltage demand amount. The system may have a spray flow input having a plurality of user selectable flow rates. The microcontroller may be programmed to adjust the supply voltage according to a selected one of the plurality of user selectable flow rates. The microcontroller may be programmed to use pulse width modulation to attenuate the supply voltage. The microcontroller may be programmed to include a comparator function that can continuously read the supply voltage from the battery and compare it to the voltage demand amount. The microcontroller may be programmed to an encoder system for obtaining results from the comparator function and directing the pulse width modulation to continuously attenuate the supply voltage so that the supply voltage matches the voltage demand amount. The encoder system may provide motor speed information to the comparator.

A further aspect is a method of controlling a battery powered liquid pump sprayer. The method involves providing a battery having a voltage supply amount, providing a motor having a voltage demand amount that is less than the voltage supply amount and using a microcontroller coupled to the battery and the motor to provide a supply voltage from the battery to the motor and to ensure that the supply voltage is at least as much as the voltage demand amount. The step of using a microcontroller coupled to the battery and the motor to provide a supply voltage includes the step of attenuating the supply voltage to match the voltage demand amount if the supply voltage is greater than the voltage demand amount. The method may further comprise the step of providing a spray flow input having a plurality of user selectable flow rates. The method may further comprise the step of using the microcontroller to adjust the supply voltage according to a selected one of the plurality of user selectable flow rates. The step of attenuating the supply voltage comprises using pulse width modulation. The method may further include the step of using a comparator function that can continuously read the supply voltage from the battery and compare it to the voltage demand amount. The method may further include the step of using an encoder system for obtaining results from the comparator function and directing the pulse width modulation to continuously attenuate the supply voltage so that the supply voltage matches the voltage demand amount. The method may further include the step of providing motor speed information to the comparator from the encoder system.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 4 is a perspective view of a prior art battery powered liquid pump backpack sprayer.

FIG. 5 is an elevation view of a prior art battery powered liquid pump backpack sprayer.

FIG. 8A is summary of the demonstrable variation in sprayer performance as the battery supply voltage becomes depleted over the duration of a spray session.

FIG. 10A is summary of the sprayer performance, in accordance with an embodiment.

DETAILED DESCRIPTION OF EMBODIMENTS

The present disclosure describes a control system for a liquid pump sprayer and is directed to a battery-powered liquid pump sprayer that comprises a novel control system capable of providing the user with a selectable series of defined spray application pressures, flow rates, and patterns that are accurately sustained over the duration of a spray application session.

Figure 1:
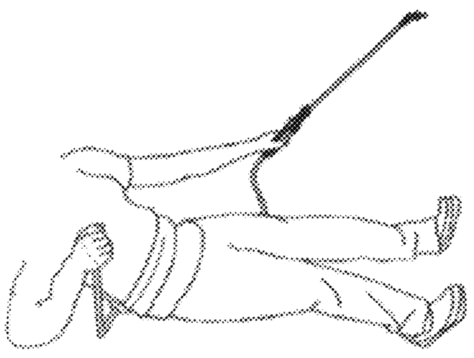
Figure 1. Prior Art
FIG. 1 is a perspective view of a prior art manual liquid pump backpack sprayer.
Figure 2:
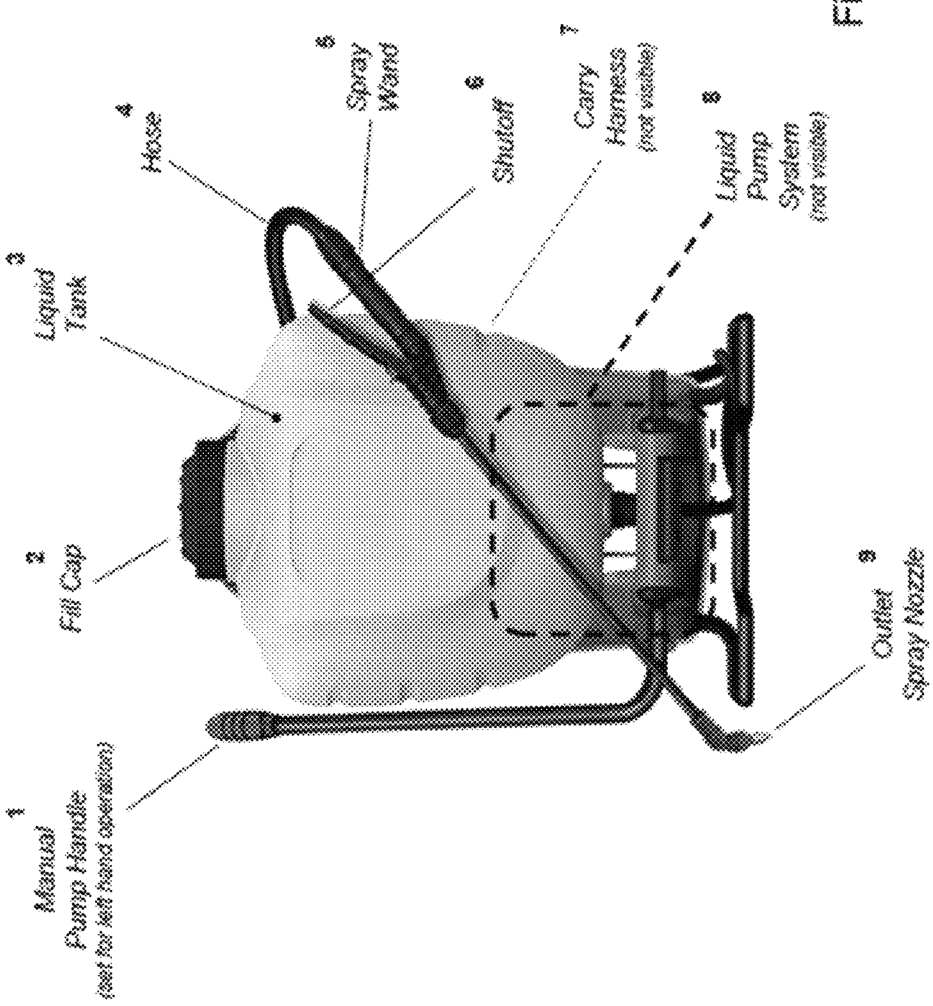
Figure 2. Prior Art
FIG. 2 is an elevation view of a prior art manual liquid pump backpack sprayer.
Figure 3:
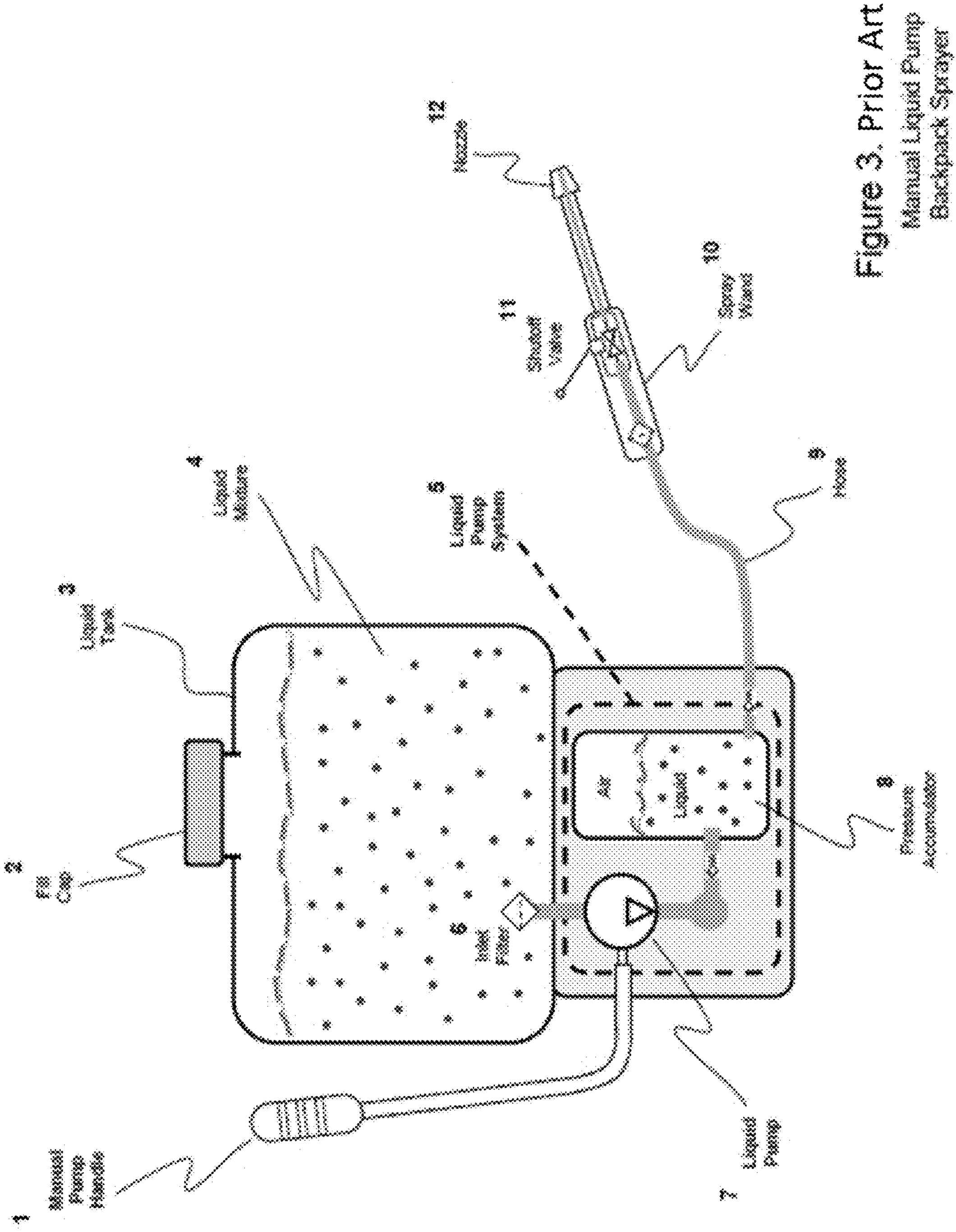
Figure 3. Prior Art
FIG. 3 is a schematic elevation view of a prior art manual liquid pump backpack sprayer.
Figure 6:
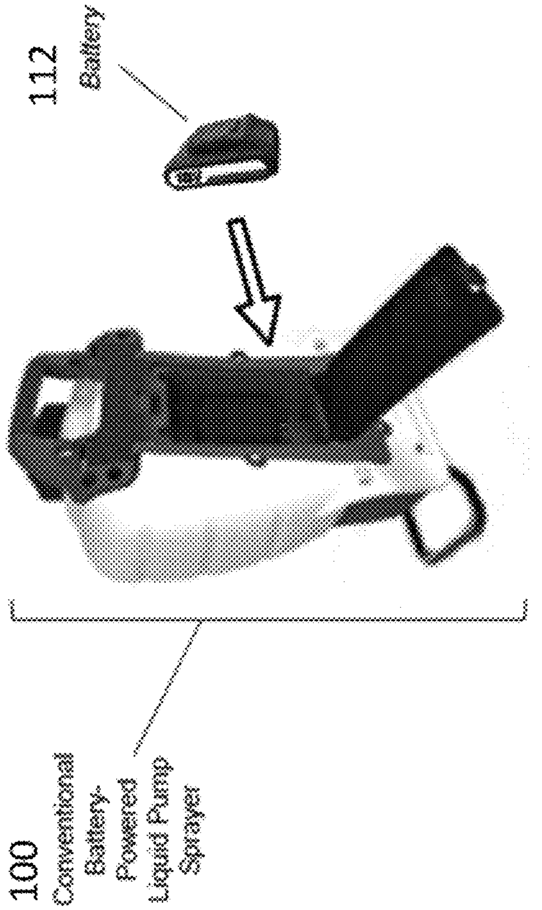
Figure 6. Prior Art
FIG. 6 is a perspective view of the battery compartment of a battery powered liquid pump backpack sprayer.
Figure 7:
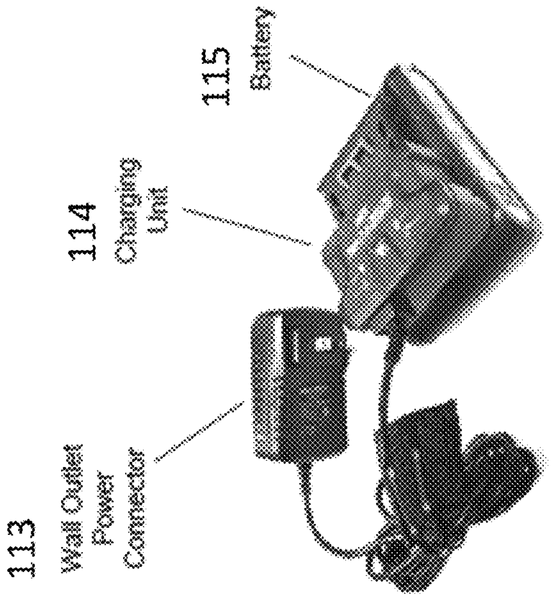
Figure 7. Prior Art
FIG. 7 is a perspective view of charging equipment used with a prior art battery powered liquid pump backpack sprayer.
Figure 8:
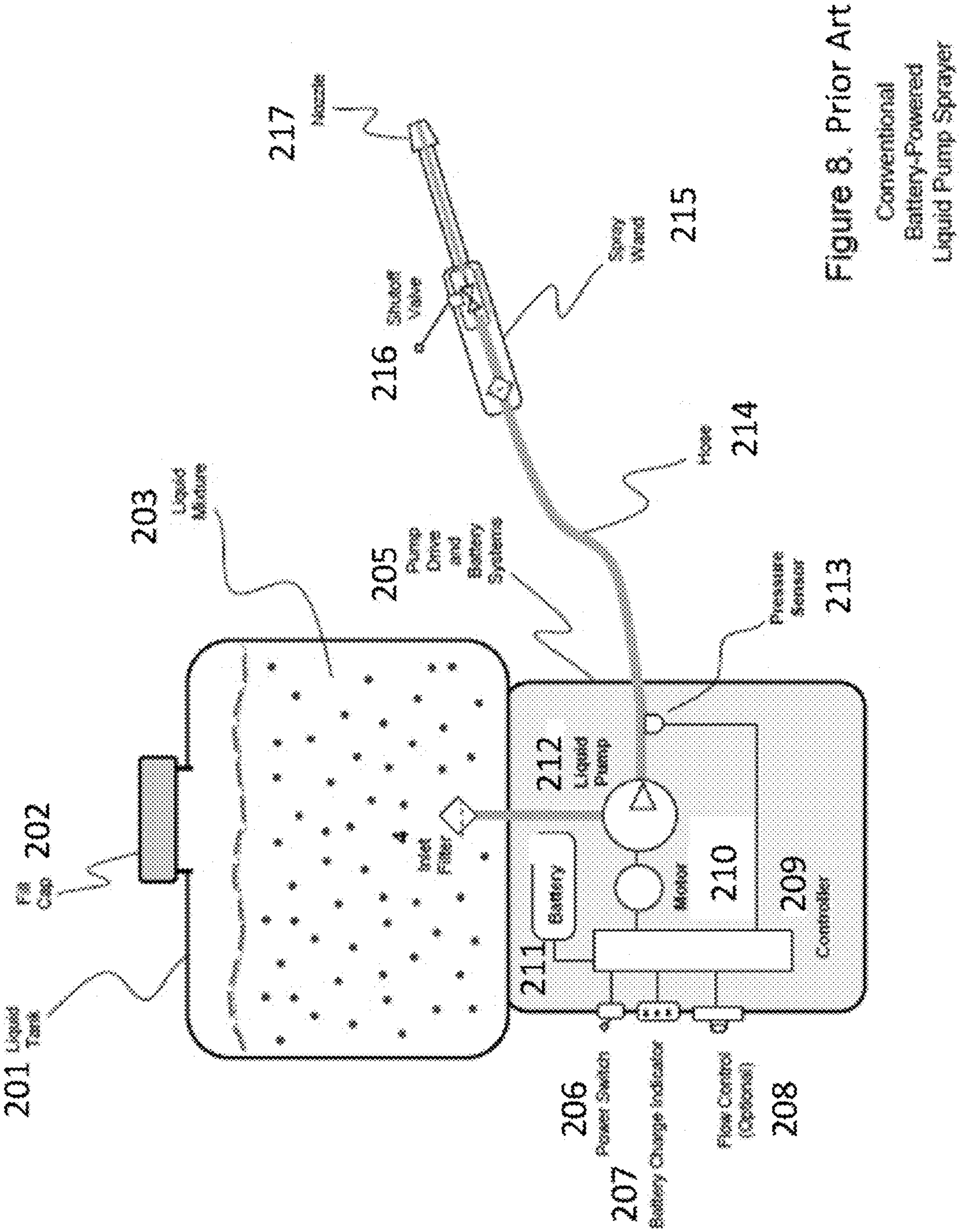
Figure 8. Prior Art
FIG. 8 is a schematic view of a prior art battery-powered liquid pump sprayer.
Figure 9:
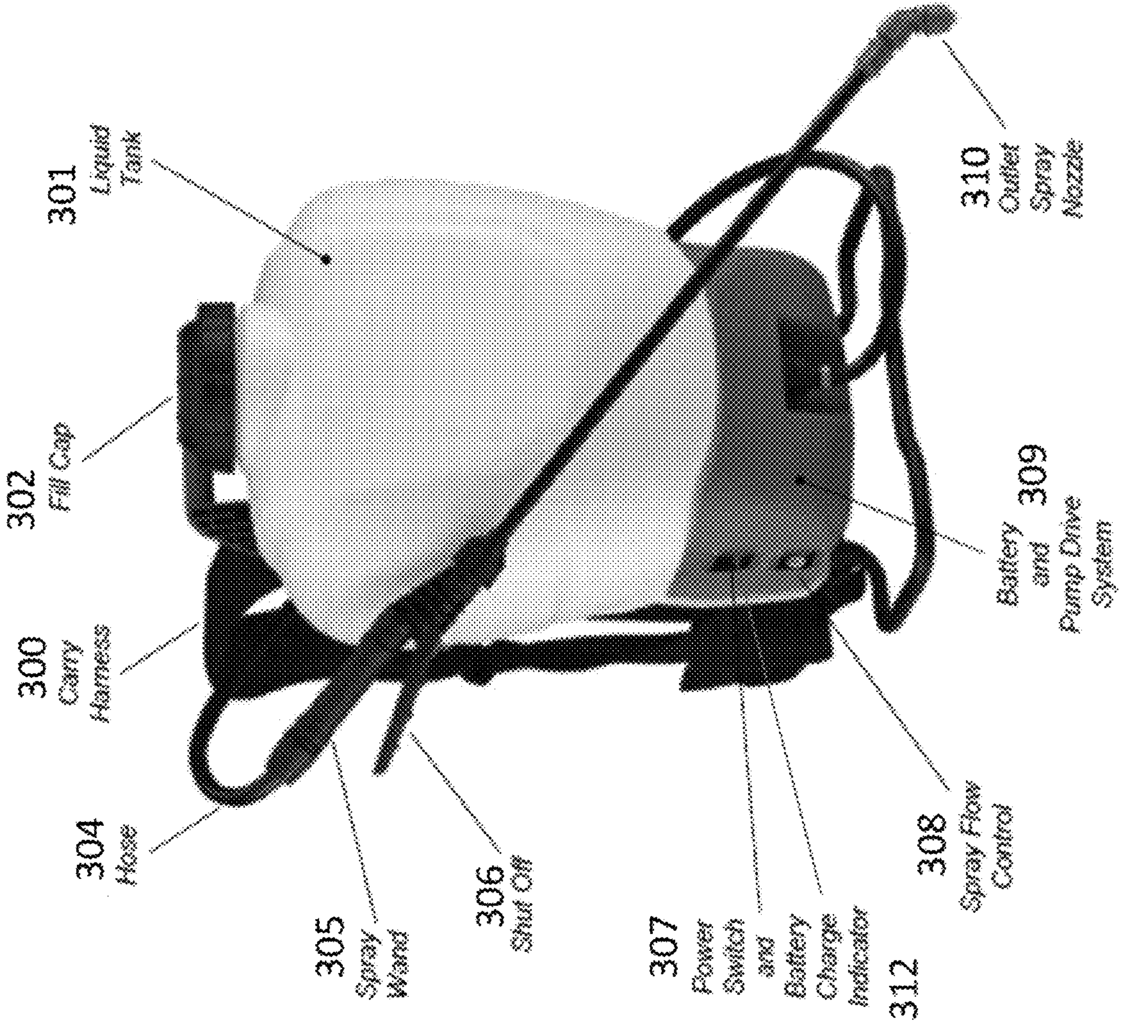
FIG. 9 is a perspective view of a battery powered liquid spray pump sprayer, in accordance with an embodiment.

FIG. 9 provides an initial overview of the disclosed battery-powered liquid-pump backpack sprayer, where the liquid is filled via cap 302, into tank 301. Harness 300 permits the sprayer to be carried on the user's back. The liquid is pressurized by the battery-powered pump drive system 309, as power switch 307 is engaged. A spray flow control 308 provides for the user to select from one of ten discrete spray nozzle application flow rates (of course, fewer or greater flow rates could be implemented). With power on and the liquid sufficiently pressurized, and with hand-held spray wand 305 aimed appropriately, shutoff 306 is opened, which permits the liquid to flow from the tank and along through hose 325 to outlet spray nozzle 310, where the liquid exits as a pattern.

A battery charge indicator 312 is conveniently provided adjacent to the power switch 307, so that the user can monitor the in-use state of charge of the rechargeable battery 309.

As with the previously-described exemplar conventional sprayer, the disclosed sprayer employs a modern nominal 18 V lithium-ion (Li-ion) battery; this battery specifies, as is typical, a safe full-charge state at 21.0 V and a safe depleted state at 16.5 V. The battery is inserted for operation, and removed for convenient charging on a separate charging station.

Figure 10:
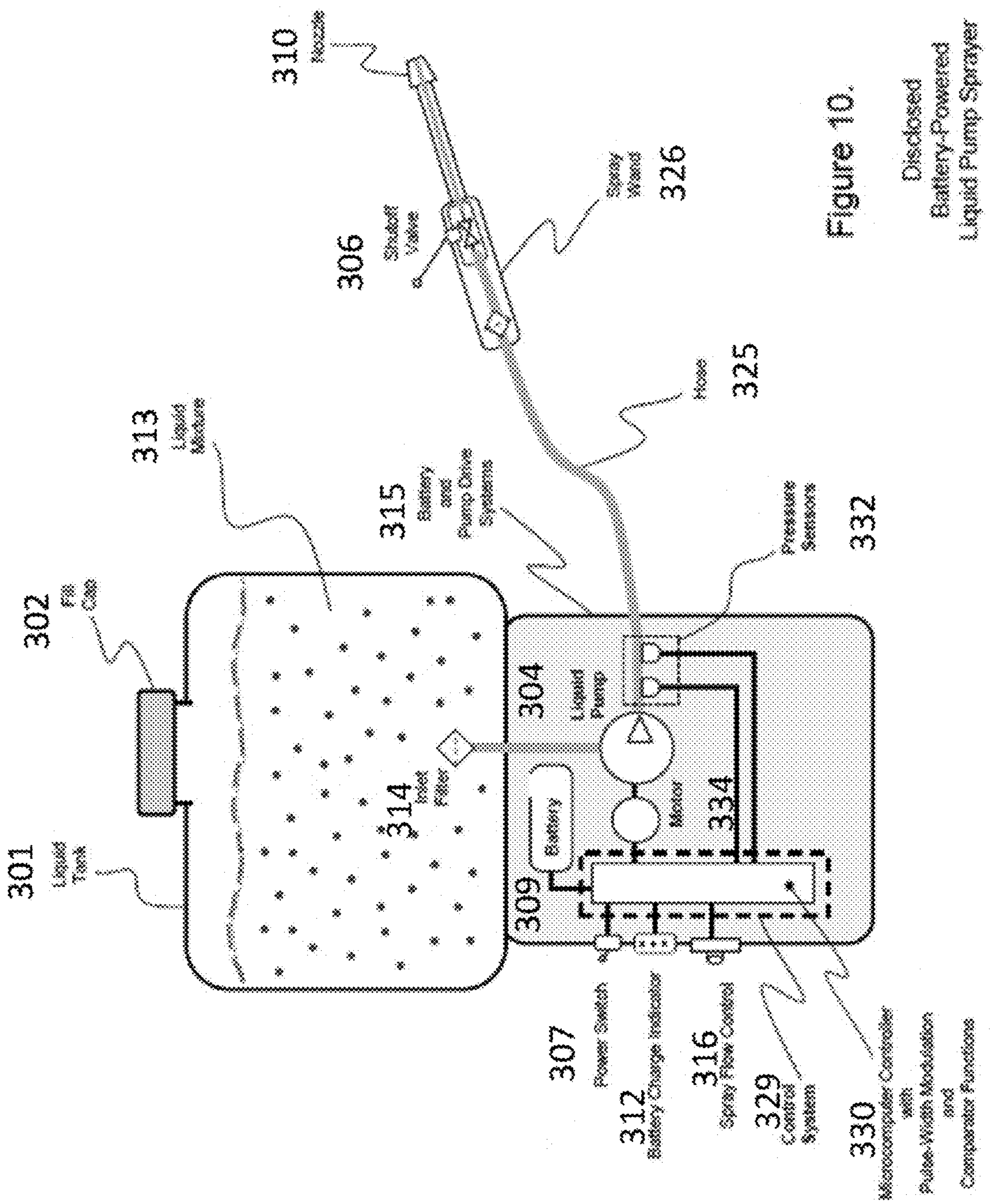
FIG. 10 is a schematic view of a battery powered liquid spray pump sprayer, in accordance with an embodiment.

The schematic of FIG. 10 represents a more detailed view of the disclosed control system for a battery-powered liquid-pump backpack sprayer. The schematic overview of the sprayer will first be provided, followed by a more specific description of the means by which the novel control system accurately sustains the liquid outlet pressure, and resulting flow rate and nozzle outlet spray pattern over the duration of a spray session.

The liquid mixture 313 to be sprayed is filled into tank 301 via the opening at fill cap 302, and enters battery 309 and pump drive systems 304 via inlet filter 314. Battery charge indicator 312 indicates the state of charge of the battery 309. A discrete spray flow control 316 enables one of ten specific nozzle application flow rates to be specified by the user. As power switch 307 is engaged, the liquid flows through inlet filter 314 and is pressurized by battery-powered pump drive system 304. With hand-held spray wand 326 aimed appropriately, shutoff 327 is opened, which permits the liquid to then flow along through hose 325 to outlet spray nozzle 328, where the liquid exits as a pattern.

With continuing reference to FIG. 10, battery and pump drive systems 309 includes novel control system 329. This novel control system comprises a microcomputer controller 330 with unique pulse-width modulation (PWM) and comparator functions. This controller is programmed to receive inputs from battery 309', pressure sensors 332, a unique discrete ten-position spray flow control 316, and power switch 307. After processing these inputs, the controller outputs include a managed supply voltage to the electric motor 334, and battery voltage-state information to battery charge indicator 312.

As managed by control system 329, the battery powers the electric motor, which drives the liquid pump by mechanical means. Note that this battery voltage, as supplied to the motor, directly controls the speed (revolutions/minute) of the motor which, in similarly direct fashion, controls the pump speed and the resulting pump outlet pressure, flow rate, and ultimate spray pattern for a given nozzle.

Controller 330, as is a typical requirement for user safety and the integrity of Li-ion batteries, monitors the supply voltage from the battery so as to limit the upper (full-charge) supply condition to 21.0 V, and terminate the battery supply when the voltage becomes depleted to a low charge limit at 16.5 V. Additionally, the controller terminates the battery supply to the motor if pressure sensors 332 detect that either a high pressure limit or low pressure limit has been reached.

A first aspect of this disclosed control system 329 is spray flow control 316, which enables the user to selectively input into controller 330 one of ten different programmed flow rate/nozzle spray application settings. These programmed, nozzle-specific flow rates, range in a preferred embodiment from 0.1 gpm to 0.5 gpm, with each setting a 0.04 gpm increment; of course, other increments and other ranges of values could be provided. As will be further disclosed, for each application setting as input from spray flow control 316, control system 329 will output a unique supply voltage to motor 334, which will result in a unique motor speed and corresponding pump outlet liquid pressure, flow rate, and nozzle-specific spray pattern.

A second aspect of this disclosed control system 329 is the application of an electric motor 334 having a nominal demand voltage that is equivalent to the nominal low limit of safe battery supply voltage.

The low limit of safe battery supply voltage for the considered 18 V Li-ion battery sprayers, as previously discussed, is 16.5 V. Accordingly, unlike the conventional application of an 18 V motor with the 18 V battery supply voltage, here is disclosed the application of a motor with a 16.5 V demand to the 18 V battery. As will be further described, this 16.5 V motor will be specified to deliver the same performance output at the 16.5 V low-limit battery supply voltage that the 18 V motor would deliver at the 16.5 V low-limit supply voltage. Importantly, in this way, the greatest required power output from this disclosed motor will be obtained when both the battery supply voltage and motor demand voltage are 16.5 V.

Continuing with this second aspect, and as previously discussed, 21.0 V is the upper limit of safe battery supply voltage for the 18 V Li-ion battery sprayers under consideration. Thus, for the disclosed sprayer having the 16.5 V motor configured with performance equivalent to the 18 V motor, there is never a battery supply voltage to the motor that is below the highest demand voltage of the motor. The benefit here is that, as the battery naturally discharges during a spraying session, whereby the supply voltage to the motor drops from the 21.0 V full-charge state to the fully-depleted 16.5 V state, the available supply voltage to the motor is always equal to or greater than the motor's 16.5 V demand.

A third aspect of this disclosed control system 329 is the unique utilization of a pulse-width modulation (PWM) function within microcomputer controller 330. In coordination with the first and second aspects whereby, with advantage, the available supply voltage to the motor is always equal to or greater than the highest motor demand voltage, this PWM function will be capably directed to continuously attenuate the varying battery supply voltage to the motor so that, for a given flow-control setting, the supply voltage to the motor is beneficially maintained at the motor demand voltage needed for that application setting.

As will be disclosed next, the PWM is provided a directive control in order to maintain, over the course of a spray session, this continuous and accurate attenuation of the varying supply voltage from the depleting battery.

The fourth aspect of this disclosed control system 329 is the comparator function within microcomputer controller 330. By continuously reading the varying supply voltage from the battery, and by comparing this available supply voltage to the motor demand voltage as specified by the selected flow rate setting, the comparator can accordingly direct the PWM to appropriately attenuate this supply voltage, so that the directed supply voltage meets, but does not exceed or fall below, this specified motor demand voltage.

Alternatively, or as a functional enhancement, the comparator function within microcomputer controller 330 may utilize an encoder system as a means to direct the PWM to appropriately and continuously attenuate the supply voltage to the motor so that, with similar beneficial result, the directed supply voltage matches the motor demand voltage as specified by the selected flow rate setting. This encoder system provides motor speed (revolutions per minute) information to the comparator for the purpose of directing PWM voltage attenuation to match the motor demand voltage as specified by the selected flow rate setting.

In summary, from the schematic of FIG. 10, the four aspects of the disclosed control system 329 comprise spray flow control 316 and the PWM and comparator functions of controller 330, working in collaboration with the designated 16.5 V motor 334, and 18 V battery 309'.

Despite the drop in available supply voltage from the battery as it discharges during operation, these four aspects of the disclosed control system enable the available battery voltage, as supplied to the motor for each often flow control settings, to be accurately aligned and sustained in order to meet each setting's defined application performance requirements for liquid pressure, flow rate, and nozzle spray pattern for the duration a spraying session.

FIG. 10A demonstrates the benefit of the disclosed control system for a battery-powered liquid pump sprayer. It will be shown that, despite the inevitable drop in battery supply voltage during the spraying session, the sprayer will provide and sustain the user-selected liquid pressure, flow rate, and resulting pattern for the full duration of the spray application session.

For this application spraying session, the ten-position flow control is set to provide 0.5 gpm at 40 psi with a straight-stream nozzle (note F). As with the equivalent exemplar conventional sprayer, and for the purpose of this comparison, this application setting represents an equivalent highest-performance output from both sprayers.

As discussed previously, because the disclosed 16.5 V motor is purposefully specified to be equivalent in performance to the conventional 18 V motor, the user-selected flow setting for this 16.5 V motor is obtained, as with the 18 V motor, when the battery supply to the motor is 16.5 volts. With equivalent pumps and nozzles employed, the motor speed necessary to produce this liquid outlet flow and pressure is the same, at 3800 rpm.

Over the duration of the spraying session, the battery becomes discharged, as expected. As shown, the battery supply voltage dropped from its full-charge upper limit of 21 volts, down to its nominal 18 volts, and eventually down to its full-discharge state limit of 16.5 volts (Input/Battery, row 8, columns P-V).

The means by which the disclosed control system can beneficially provide and sustain the user-selected liquid pressure, flow rate, and resulting pattern for the full duration of the spray application session is presented in the charted values for the PWM Percent Duty Cycle (Input/Motor, row 10, columns P-V). As directed by the controller comparator function, the controller PWM function provides greatest attenuation at the battery's upper supply voltage of 21.0 V, resulting in a 75 percent PWM duty cycle (rows 8 and 10, column Q). This attenuation provides the needed supply of 16.5 V to the motor.

As the battery discharges, this charting of the PWM duty cycle shows how the control system continues to provide, with decreasing attenuation provided by the increasing PWM duty cycle, a constant 16.5 V battery supply to the motor.

Accordingly, this constant 16.5 V supply to the motor enables the motor to drive the pump with a constant speed of 3800 rpm (Input/Motor, row 11, columns P-V)

With the motor speed maintained at 3800 rpm for the duration of the spray session, the charting of pump pressure and pump flow (note G) demonstrates that the user-selected application setting of 0.50 gpm at 40 psi is accordingly held constant for the session, even as the battery supply voltage is dropping from its upper limit of 21.0 volts to its lower limit of 16.5 volts.

The disclosed beneficial control of liquid pump performance as charted in FIG. 10A for the selected spray flow setting would be similarly obtained for each of the other nine user-selectable spray flow application settings.

As has been shown, for both manual and battery-powered liquid pump sprayers, the means for control of liquid pressure is an important aspect of sprayer performance.

The novel control system disclosed herein improves upon such conventional sprayers by providing a user-selectable series of defined spray application pressures, flow rates, and patterns that are that are accurately sustained over the duration of a spray application session. This control system provides for efficient, accurate, and economical application of the sprayed liquid product.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A control system for a battery powered liquid pump sprayer, comprising:

a battery having a voltage supply amount;

a motor having a voltage demand amount that is less than the voltage supply amount;

a microcontroller coupled to the battery and the motor, wherein the microcontroller is programmed to provide a supply voltage from the battery to the motor, to ensure that the supply voltage is at least as much as the voltage demand amount, and to attenuate the supply voltage to match the voltage demand amount if the supply voltage is greater than the voltage demand amount;

a spray flow input having a plurality of user selectable flow rates, wherein the microcontroller is programmed to:

adjust the supply voltage according to a selected one of the plurality of user selectable flow rates;

to use pulse width modulation to attenuate the supply voltage;

to include a comparator function that can continuously read the supply voltage from the battery and compare it to the voltage demand amount; and to an encoder system for obtaining results from the comparator function and directing pulse width modulation to continuously attenuate the supply voltage so that the supply voltage matches the voltage demand amount.

2. The control system of claim 1, wherein the encoder system provides motor speed information to the comparator.

3. A method of controlling a battery powered liquid pump sprayer, comprising the steps of:

providing a battery having a voltage supply amount;

providing a motor having a voltage demand amount that is less than the voltage supply amount;

using a microcontroller coupled to the battery and the motor to provide a supply voltage from the battery to the motor, ensure that the supply voltage is at least as much as the voltage demand amount, and attenuating the supply voltage by using pulse width modulation to match the voltage demand amount if the supply voltage is greater than the voltage demand amount;

providing a spray flow input having a plurality of user selectable flow rates;

using the microcontroller to adjust the supply voltage according to a selected one of the plurality of user selectable flow rates;

including a comparator function that can continuously read the supply voltage from the battery and compare it to the voltage demand amount; and including an encoder system for obtaining results from the comparator function and directing the pulse width modulation to continuously attenuate the supply voltage so that the supply voltage matches the voltage demand amount.

4. The method of claim 3, further comprising the step of providing motor speed information to the comparator function from the encoder system.

* * * * *